US007874061B2

(12) United States Patent
Murata

(10) Patent No.: US 7,874,061 B2
(45) Date of Patent: Jan. 25, 2011

(54) MANUFACTURING METHOD OF A YOKE OF ROTARY ELECTRIC MACHINE

(75) Inventor: Mitsuhiro Murata, Niwa-gun (JP)

(73) Assignee: Denso Corporation, Kariya (JP)

( * ) Notice: Subject to any disclaimer, the term of this patent is extended or adjusted under 35 U.S.C. 154(b) by 291 days.

(21) Appl. No.: 11/598,736

(22) Filed: Nov. 14, 2006

(65) Prior Publication Data

US 2007/0126302 A1 Jun. 7, 2007

(30) Foreign Application Priority Data

Dec. 2, 2005 (JP) ............................. 2005-348671

(51) Int. Cl.
*H02K 15/14* (2006.01)
(52) U.S. Cl. .......................... 29/596; 29/732; 29/527.4; 310/89
(58) Field of Classification Search ........... 29/596–598, 29/732–736; 310/10, 42, 89, 525
See application file for complete search history.

(56) References Cited

U.S. PATENT DOCUMENTS

| 4,309,815 | A | * | 1/1982 | Schmitt et al. | ................. | 29/596 |
| 5,201,111 | A | | 4/1993 | Prohaska | | |
| 6,219,900 | B1 | * | 4/2001 | Suzuki | ........................ | 29/598 |
| 6,235,410 | B1 | | 5/2001 | Komatsu et al. | | |
| 6,379,820 | B1 | | 4/2002 | Komatsu et al. | | |
| 6,804,874 | B2 | * | 10/2004 | Niimi et al. | ................... | 29/596 |
| 7,168,151 | B2 | * | 1/2007 | Niimi et al. | ................... | 29/596 |
| 2002/0011756 | A1 | | 1/2002 | Akutsu et al. | | |
| 2007/0126302 | A1 | * | 6/2007 | Murata | ................. | 310/154.15 |

FOREIGN PATENT DOCUMENTS

| JP | A 64-060247 | 3/1989 |
| JP | U-64-047569 | 3/1989 |
| JP | A-08-308160 | 11/1996 |
| JP | A-10-226865 | 8/1998 |
| JP | A-2002-044886 | 2/2002 |
| JP | A-2004-032895 | 1/2004 |
| JP | A-2004-222384 | 8/2004 |
| JP | A-2005-269691 | 9/2005 |

OTHER PUBLICATIONS

Translated Chinese Office Action; Beijing, P.R. China (Feb. 6, 2009) pp. 1-3 [First Office Action], pp. 1-4 [The First Office Action (Text)]; 7 pgs total.

* cited by examiner

*Primary Examiner*—Minh Trinh
(74) *Attorney, Agent, or Firm*—Oliff & Berridge, PLC

(57) ABSTRACT

A yoke is produced by rolling up Zn—Al—Mg platinized steel plate of corrosion-resistance treatment where both ends thereof are tightly mated. On the outer peripheral surface of the yoke, plural linear grooves extending in the axis direction of the yoke are formed at a constant interval in the rolling step. Because the steel plate of corrosion-resistance treatment is prepared before initiating the rolling step, it is not necessary to perform coating and electroplating after making a cylindrical shaped yoke, namely, not necessary to perform any coating and electroplating after making the yoke, and the grooves are not filled with reaction products. This increases the radiation capability of the yoke because of increase of the entire surface area of the yoke. The Zn—Al—Mg platinized steel has a silver color and hardly absorbs radiant heat from an engine of a vehicle, and suppresses the increasing of the yoke temperature.

9 Claims, 5 Drawing Sheets

AXIS DIRECTION

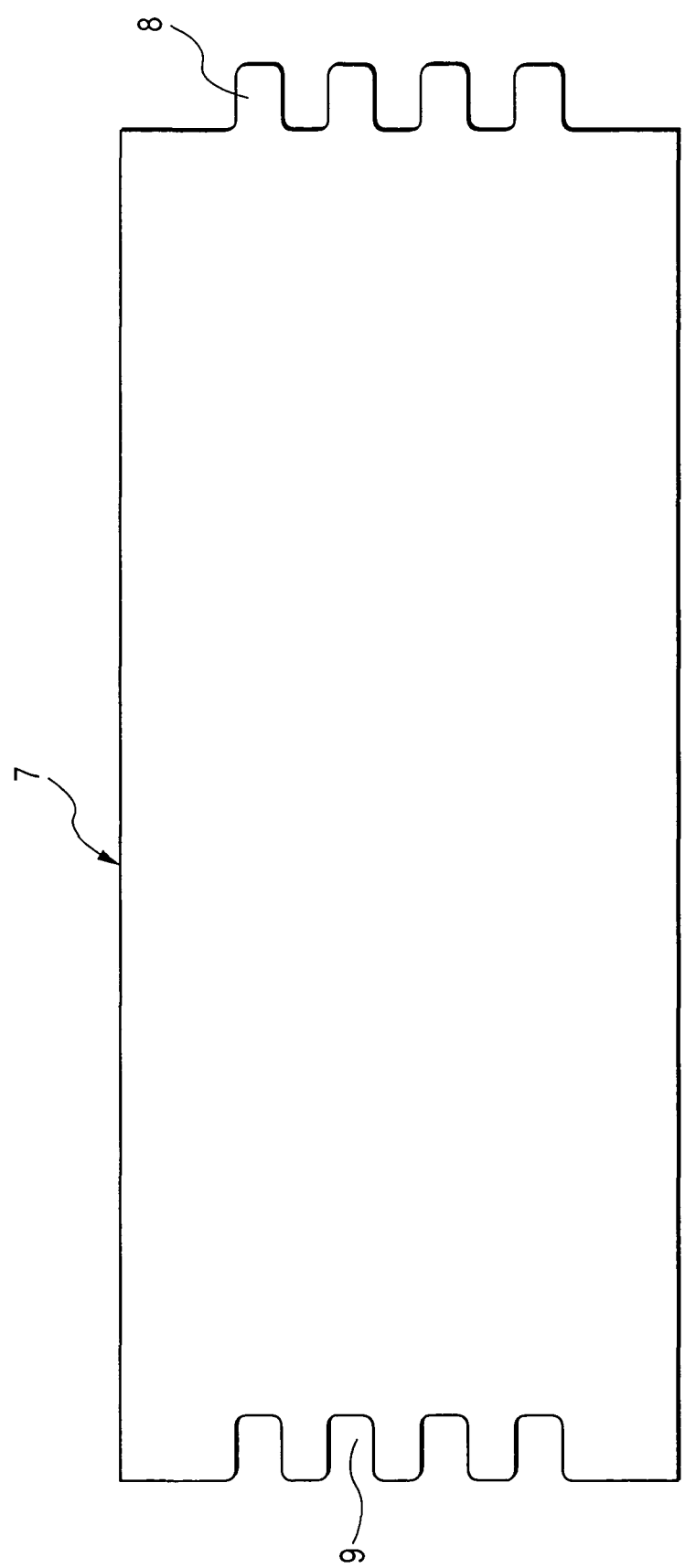

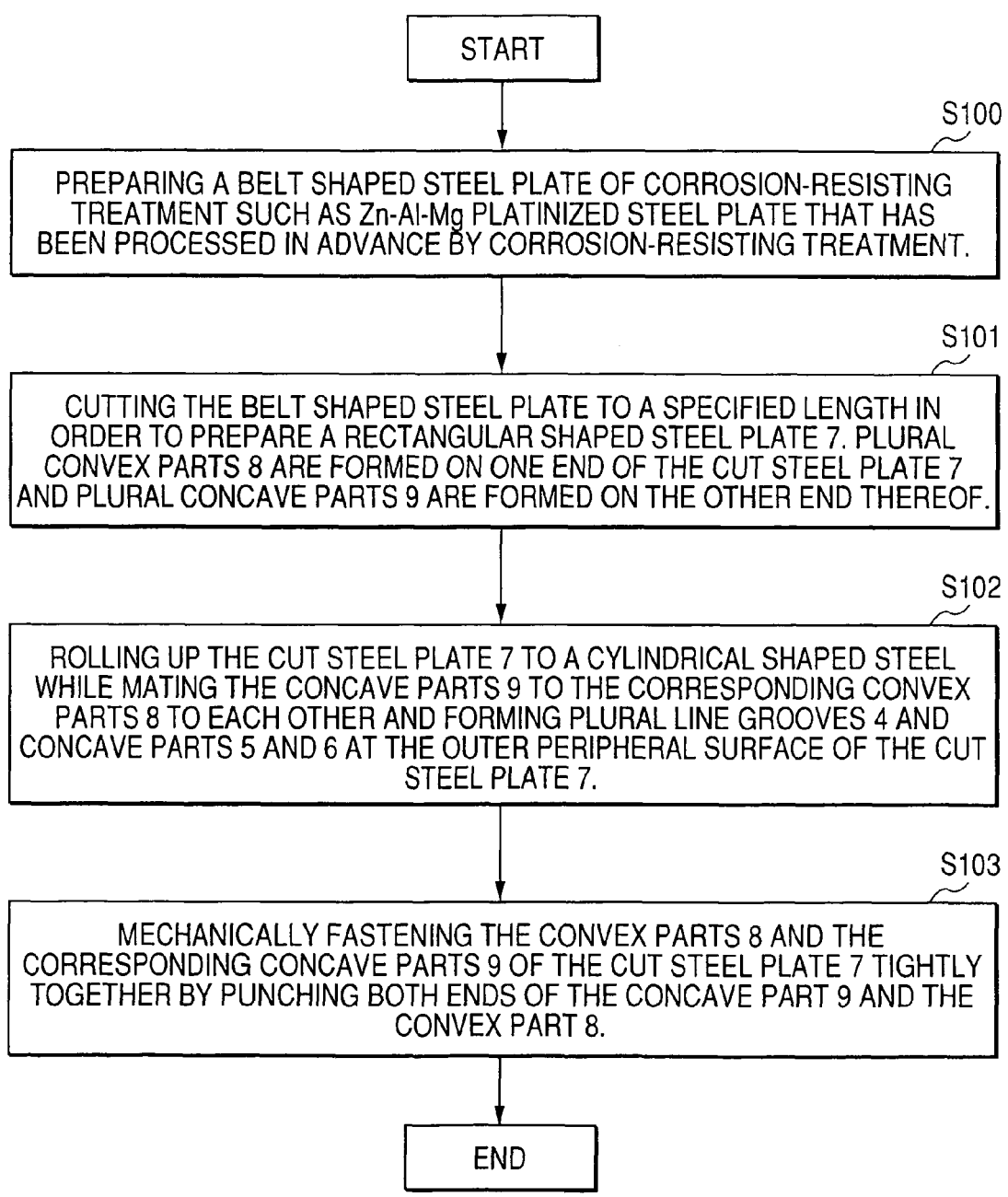

MANUFACTURING METHOD OF A YOKE OF ROTARY ELECTRIC MACHINE

CROSS-REFERENCE TO RELATED APPLICATIONS

This application is related to and claims priority from Japanese Patent Application No. 2005-348671 filed on Dec. 2, 2005, the contents of which are hereby incorporated by reference.

BACKGROUND OF THE INVENTION

1. Field of the Invention

The present invention relates to a yoke forming a magnetic circuit of a rotary electric machine such as a starter mounted on a vehicle.

2. Description of the Related Art

For example, there are various techniques for producing a yoke as a component of a rotary electric machine (or a motor) such as a starter to be mounted on a vehicle. Japanese patent laid open publication No. JP S64-60247 has disclosed such techniques, drawing and blanking and caulking. The former technique performs the drawing process to make a cylinder shaped body from a steel plate. The latter technique performs the blanking process to make a cylindrical shaped body and then performing the caulking process to caulk both ends of the cylindrical shaped body.

However, both the conventional techniques require to perform coating to cover the surface of the cylinder shaped body with a corrosion-resisting thin film, or to perform electroplating, and then to cut the corrosion-resistance thin film of both end surfaces of the cylindrical shaped body in order to obtain electric conductive surfaces. Thus, the conventional techniques require plural manufacturing steps to make a yoke.

Recently, there is a trend to reduce in weight a starter in view of fuel consumption reduction. One technique to reduce the weight of a starter decreases the entire volume of a motor based on a high reduction ratio. However, although such a technology further reduces the thermal capacity thereof in addition to the reduction of the size or volume of the motor, there is a limit to the magnitude of the reduction. Thus, there still remains a technological problem how to enhance the radiation capability of the motor.

SUMMARY OF THE INVENTION

It is an object of the present invention to provide a yoke of a rotary electric machine and a manufacturing method of producing the yoke having a superior radiation capability.

According to an aspect of the present invention, there is provided a yoke of a rotary electric machine. The yoke has a cylindrical shape that is made of a steel plate of a corrosion-resistance treatment. The yoke has plural grooves or concave parts formed on an outer peripheral surface of the yoke. Because the plural grooves or the concave parts are formed on the outer peripheral surface of the yoke, the configuration can increase the entire surface area of the yoke, and also enhances its radiation capability.

Because the yoke of the present invention is made by a steel plate of a corrosion-resistance treatment that is processed in advance by a corrosion-resistance treatment, it is not necessary to perform coating or electroplating after making the cylindrical shaped yoke, and the grooves are not thereby filled with products such as reaction products. Therefore the radiation capability of the yoke of the present invention hardly decreases.

According to another aspect of the present invention, there is provided the yoke of a rotary electric machine in which the steel plate of the corrosion-resistance treatment is Zn—Al—Mg platinized steel. The Zn—Al—Mg platinized steel has a superior corrosion-resistance capability and automatically generates a dense protection film (or an oxide film) on the surface thereof if the surface of the Zn—Al—Mg platinized steel is damaged. Accordingly, even if the plural grooves are formed on the outer peripheral surface of the yoke so as to enhance the radiation capability, the corrosion-resistance capability of the yoke is not decreased. Because being silver color, the surface of Zn—Al—Mg platinized steel hardly absorb radiation heat, it is possible to prevent the temperature rise of the yoke.

According to another aspect of the present invention, there is provided the yoke of a rotary electric machine in which the plural groves are formed on the outer peripheral surface of the yoke in its axis direction along the whole circumference thereof. That is, the yoke has the plural grooves formed on the outer peripheral surface thereof through the whole circumference. Because the entire surface area of the yoke is thereby increased, it is possible to enhance the radiation capability of the yoke.

Further, according to another aspect of the present invention, there is provided a manufacturing method of producing the yoke of a rotary electric machine having cutting step and a rolling step. The cutting step uses a steel plate of corrosion-resisting treatment as a commercial product that has been processed in advance by corrosion-resisting treatment. In the cutting step, the steel plate is cut to a specified length. In the rolling step, the cut steel plate of the specified length is rolled while forming one of plural grooves and concave parts on an outer peripheral surface of the steel plate in order to increase an entire surface area of the yoke.

Accordingly, the manufacturing method of the present invention can perform both the groove formation to form the grooves on the outer peripheral surface of the steel plate and the rolling to roll up the steel plate simultaneously, namely, both processes are not performed in different steps. This can drastically reduce the total number of manufacturing steps of producing the yoke when compared with the conventional manufacturing method.

Still further, according to another aspect of the present invention, there is provided the manufacturing method in which the cut steel plate that has been cut to a specified length is gradually rolled while forming the grooves on the outer peripheral surface of the cut steel plate along the axis direction thereof. The grooves are formed on the outer peripheral surface of the cut steel plate while gradually rolling up the cut steel plate. This can release any distortion generated in the steel plate while rolling up the cut steel plate. It is thereby possible to increase the out of roundness of the yoke.

Moreover, according to another aspect of the present invention, there is provided the manufacturing method in which the steel plate is Zn—Al—Mg platinized steel. The Zn—Al—Mg platinized steel has a superior corrosion-resistance capability and automatically generates a dense protection film (or oxide film) on the surface thereof if the surface of the Zn—Al—Mg platinized steel is damaged. Accordingly, even if the plural grooves are formed on the outer peripheral surface of the yoke so as to enhance the radiation capability, the corrosion-resistance capability of the yoke is not decreased. Because being silver color, the surface of Zn—Al—Mg platinized steel hardly absorb radiation heat, it is possible to prevent the temperature rise of the yoke.

BRIEF DESCRIPTION OF THE DRAWINGS

A preferred, non-limiting embodiment of the present invention will be described by way of example with reference to the accompanying drawings, in which:

FIG. 4 is a plan view of a steel plate that has been cut in a longitudinal direction thereof; and FIG. 5 is a flow chart showing a manufacturing method of producing the yoke of the embodiment according to the present invention.

DETAILED DESCRIPTION OF THE PREFERRED EMBODIMENT

Figure 1:
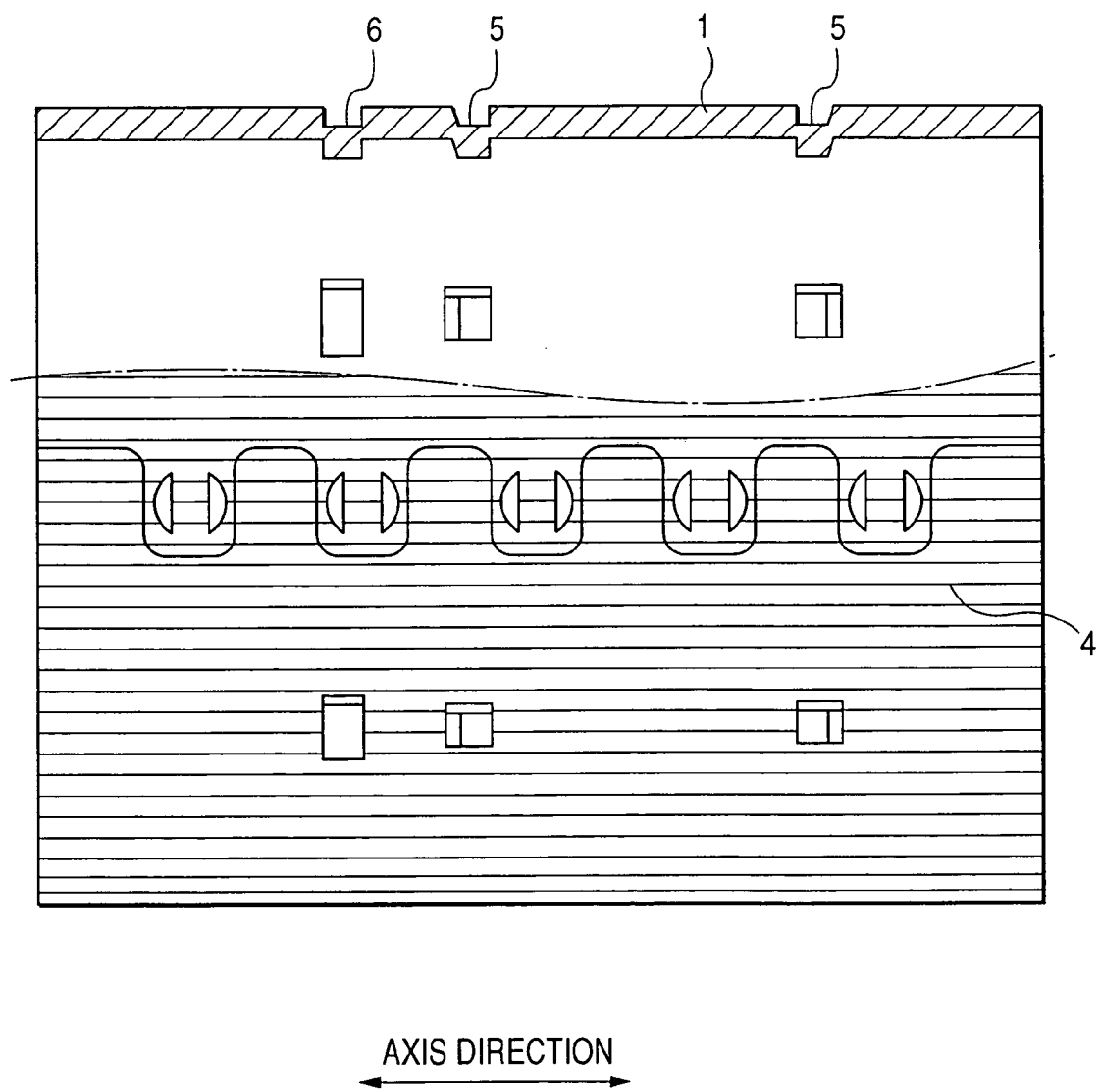
FIG. 1 is a side view of a yoke according to an embodiment of the present invention, and FIG. 1 also shows a partial cross section of the yoke.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of the yoke 1 of a rotary electric machine and a manufacturing method thereof according to the embodiment of the present invention with reference to FIG. 1 to FIG. 5.

FIG. 1 is a side view of the yoke 1 according to an embodiment of the present invention. FIG. 1 also shows a partial cross section of the yoke 1.

The yoke 1 of the embodiment forms a starter motor (as a rotary electric machine) of starting an internal combustion engine mounted on a vehicle, for example.

Figure 3:
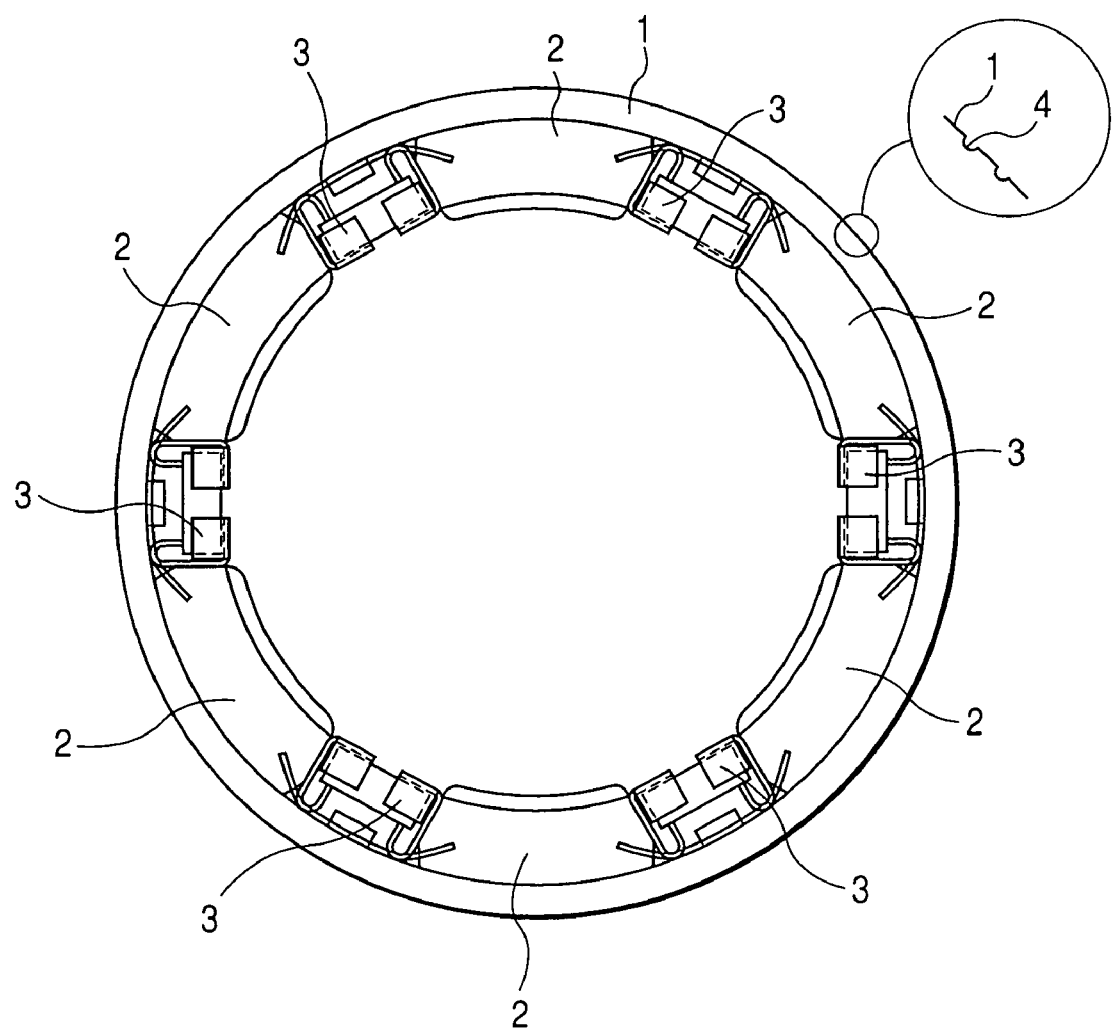
FIG. 3 is a plan view of the yoke assembled in an axis direction.

FIG. 3 is a plan view of the yoke 1 assembled in an axis direction. As shown in FIG. 3, a plurality of permanent magnets 2 are arranged in and fixed to the inner periphery of the yoke 1 by magnet supporting members 3. In particular, FIG. 3 shows the six permanent magnets 2 that form a yoke assembly as a field magnet. As shown in FIG. 1, plural line grooves 4 are formed at a regular interval on the outer peripheral surface of the yoke 1 along the whole circumference thereof. Each line groove 4 is extended toward the axis direction of the yoke 1. In addition, plural concave portions 5 and 6 are formed on the outer peripheral surface of the yoke 1. Each concave portion 5 is used for positioning the permanent magnet 2 in the axis direction (or in the right/left direction shown in FIG. 3). Each concave portion 6 is used for positioning a dustproof plate (omitted from the drawings).

Next, a description will now be given of the manufacturing method of producing the yoke 1 of the embodiment with reference to FIG. 5.

FIG. 5 is a flow chart of the manufacturing method of producing the yoke 1 of the embodiment according to the present invention.

The yoke 1 of the embodiment is produced by following steps.

Firstly, Cutting step S101 is performed. Before performing the cutting step, a belt shaped steel material of corrosion-resisting treatment as a commercial product is prepared, which has been performed in advance by corrosion-resisting treatment. In the cutting step S101, the belt shaped steel material is cut to a specified length in order to prepare a plurality of rectangular shaped steel plates 7. A plurality of convex parts 8 are formed on one end of the cut steel plate 7 and a plurality of concave parts 9 are formed on the other end thereof. FIG. 4 is a plan view of the cut steel plate 7 that has been cut in a longitudinal direction thereof.

FIG. 4 further shows the cut steel plate 7 in which the four convex parts 8 and the four concave parts 9 are formed.

Figure 2:
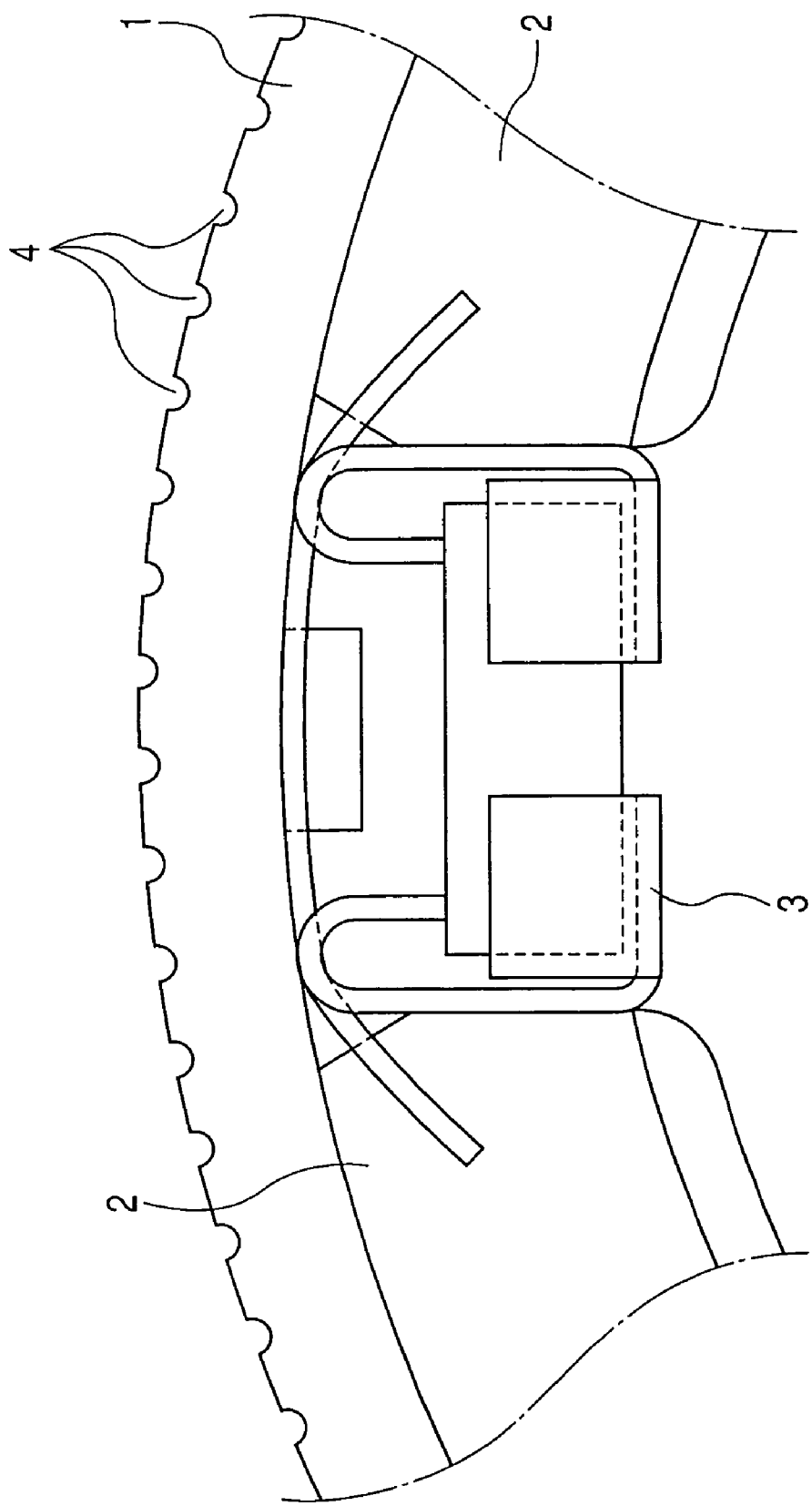
FIG. 2 is an enlarged sectional view showing a sectional shape of a groove formed on an outer peripheral surface of the yoke.

Next, Rolling step S102 is performed. In the rolling step S102, each cut steel plate 7 is rolled up to a cylindrical shaped steel while the concave parts 9 and the corresponding convex parts 8 are mated to each other. In the rolling step S102, the plural line grooves 4 and the concave parts 5 and 6 are formed at the outer peripheral surface of the cut steel plate 7. FIG. 2 is an enlarged sectional view showing a sectional shape of each line groove 4 formed on the outer peripheral surface of the yoke 1. That is, FIG. 2 shows the enlarged cross section of the plural line grooves 4 formed on the outer peripheral surface of the cut steel plate 7.

Finally, Mating step S103 is performed. In the mating step S103, each of the convex parts 8 and each of the concave parts 9 are mechanically fastened tightly to each other by punching both ends of the concave part 9 and the convex part 8. Thereby, the manufacturing method of producing the yoke 1 is completed.

(Effect of the Yoke 1 of the Embodiment)

As clearly shown in FIG. 1 and FIG. 4, the yoke 1 of the embodiment has the plural line grooves 4 formed on the outer peripheral surface of the yoke 1 through the whole circumference thereof. Because the entire surface area of the yoke 1 can be thereby increased, it is possible to enhance the radiation capability of the yoke 1. Further because the cylindrical shaped yoke 1 (namely, the tube liked yoke 1) is made by the steel plate 7 given the corrosion-resistance treatment in advance, it is not necessary to perform any coating and electroplating steps after the completion of the cutting step S101, the rolling step S102, and the mating step S103. Because the line grooves 4 are not filled with various products such as reaction products or choked with various materials for use in the coating step or the electroplating step, this feature prevents the decrease of the radiation capability of the yoke 1.

Further, it is possible to use Zn—Al—Mg platinized steel as the steel plate 7 that has been processed by corrosion-resistance treatment. The Zn—Al—Mg platinized steel has a superior corrosion-resistance capability and automatically generates a dense protection film (or an oxide film) on the surface thereof even if the surface of the Zn—Al—Mg platinized steel is damaged. Accordingly, even if the plural line grooves 4 are formed on the outer peripheral surface of the yoke 1 so as to enhance the radiation capability, the corrosion-resistance capability of the yoke 1 is not decreased.

Because being silver color, the surface of Zn—Al—Mg platinized steel hardly absorb radiation heat, it is possible to prevent the temperature rise of the yoke 1.

In the conventional yoke manufacturing method as the related art that has been previously described in the section "Description of the Related Art", after making a tube, the electroplating step must be performed for the tube. Then, the corrosion-resistance treatment film coated on the surface of the tube must be cut in order to obtain an electric conductivity at the end surface of the tube in the axis direction. After following necessary steps are performed in order to make a yoke. Thus, the conventional yoke manufacturing method must perform a plurality of manufacturing steps when compared with the manufacturing method according to the present invention. It increases the manufacturing cost.

On the contrary, because the steel plate 7 (specifically, Zn—Al—Mg platinized steel) that has been processed in advance by the corrosion-resistance treatment is used, it is not necessary to perform the electroplating step or the coating step, and the cutting step of cutting the end surface of the yoke in the axis direction after making the cylindrical shaped yoke. That is, the manufacturing method of the embodiment according to the present invention can eliminate performing the coating step or the electroplating step. The manufacturing method performs the cutting step of cutting the ends of the yoke 1 in the axis direction in order to electrically connect the yoke to the ground potential level, after making the cylindrical shaped yoke 1. Accordingly, the manufacturing method of the present invention can drastically reduce the total number of the manufacturing steps.

Furthermore, the grooves 4 are formed on the outer peripheral surface of the yoke 1 during the rolling step of rolling the steel plate 7. In other words, the grooves 4 are formed on the outer peripheral surface of the yoke 1 while gradually rolling up the steel plate 7. This can release any distortion generated in the steel plate 7 during rolling up the steel plate 7. It is thereby possible to increase the out of roundness of the yoke 1.

(Modification)

The embodiment according to the present invention described above discloses an example of forming the plural line grooves 4 on the outer peripheral surface of the yoke 1 in order to increase the entire area of the yoke 1. However, the concept of the present invention is not limited by the above manner, it is possible to form concave parts on the outer peripheral surface of the yoke instead of forming the line grooves 4. The concave parts 5 and the convex parts 6 (see FIG. 1), for positioning the permanent magnet and the dust-proof plate (not shown), formed on the outer peripheral surface of the yoke 1 are also capable of increasing the surface area of the yoke 1.

Further, although the embodiment of the present invention discloses that the permanent magnets 2 are fixed to the inner periphery of the yoke 1, it is possible to use field coil instead of the permanent magnets 2.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A manufacturing method of producing a yoke of a rotary electric machine, comprising steps of:
   cutting a steel plate that is processed in advance by corrosion-resisting treatment into a specified length, and forming a plurality of first concave parts at one end part of the cut steel plate and a plurality of convex parts at the other end part of the cut steel plate of the specified length;
   rolling the cut steel plate of the specified length so that the first concave parts and the convex parts are mated together while forming a plurality of line grooves on an outer circumferential surface of the cut steel plate, in order to increase a surface area of the yoke; and
   mechanically fastening the convex parts and the first concave parts of the cut steel plate tightly together.

2. The manufacturing method of producing a yoke of a rotary electric machine according to claim 1, wherein the cut steel plate is gradually rolled while forming the plurality of line grooves on the outer circumferential surface of the cut steel plate along an axis direction of the yoke.

3. The manufacturing method of producing a yoke of a rotary electric machine according to claim 2, the steel plate being Zn—Al—Mg platinized steel.

4. The manufacturing method of producing a yoke of a rotary electric machine according to claim 2, wherein second concave parts are formed on the outer circumferential surface while gradually rolling the cut steel plate along the axis direction of the yoke for positioning a magnet or a dust-proof plate.

5. The manufacturing method of producing a yoke of a rotary electric machine according to claim 1, the steel plate being Zn—Al—Mg platinized steel.

6. The manufacturing method of producing a yoke of a rotary electric machine according to claim 1, wherein the plurality of line grooves are formed at a constant interval on the outer circumferential surface in a circumferential direction of the yoke and each of the plurality of line grooves is a linear shape extending along the axial direction of the yoke.

7. The manufacturing method of producing a yoke of a rotary electric machine according to claim 1, the yoke being made by mechanically mating both ends of the cut steel plate.

8. The manufacturing method of producing a yoke of a rotary electric machine according to claim 1, wherein a depth of the plurality of line grooves is thinner than a depth of the cut steel plate.

9. The manufacturing method of producing a yoke of a rotary electric machine according to claim 1, wherein second concave parts are formed on the outer circumferential surface while rolling the cut steel plate for positioning a magnet or a dust-proof plate.

* * * * *